(12) United States Patent
Kudo et al.

(10) Patent No.: US 7,166,992 B2
(45) Date of Patent: Jan. 23, 2007

(54) ELECTRONIC COMPONENT FOR POWER SUPPLY AND A POWER SUPPLY DEVICE

(75) Inventors: Ryotaro Kudo, Takasaki (JP); Kyoichi Hosokawa, Takasaki (JP); Koji Tateno, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/338,711

(22) Filed: Jan. 25, 2006

(65) Prior Publication Data
US 2006/0164057 A1 Jul. 27, 2006

(30) Foreign Application Priority Data
Jan. 26, 2005 (JP) .............................. 2005-017578

(51) Int. Cl.
*G05F 1/46* (2006.01)

(52) U.S. Cl. ..................................... 323/282

(58) Field of Classification Search ................ 323/282, 323/283, 284, 285, 351
See application file for complete search history.

(56) References Cited

U.S. PATENT DOCUMENTS 6,504,351 B1* 1/2003 Eagar et al. ................ 323/282
6,870,354 B1* 3/2005 Nishimaki .................. 323/284
2006/0113980 A1* 6/2006 Yoshida ...................... 323/282

FOREIGN PATENT DOCUMENTS

JP 2002-281743 9/2002

* cited by examiner

*Primary Examiner*—Adolf Berhane
(74) *Attorney, Agent, or Firm*—Mattingly, Stanger, Malur & Brundidge, P.C.

(57) ABSTRACT

This invention provides a semiconductor integrated circuit for drive and a module for building a synchronous rectifier type switching regulator that is able to correctly detect and prevent a reverse current flowing through a coil (inductance element) during light load using a comparator and has a good power efficiency. In a synchronous rectifier type switching regulator including a reverse current detection circuit that is able to detect a state in which a reverse current flows through the inductance element (coil) and a reverse current prevention function, a switching element for synchronous rectification is formed by a plurality of parallel transistors and the transistors are controlled so that a part of them are not driven during light load.

10 Claims, 7 Drawing Sheets

ELECTRONIC COMPONENT FOR POWER SUPPLY AND A POWER SUPPLY DEVICE

CROSS-REFERENCE TO RELATED APPLICATION

The present application claims priority from Japanese application No. 2005-017578 filed on Jan. 26, 2005, the content of which is hereby incorporated by reference into this application.

BACKGROUND OF THE INVENTION

The present invention relates to a technique for improving the DC-DC conversion efficiency of a synchronous rectifier type DC-DC converter and a technique for improving the conversion efficiency by reducing power loss during light load in a synchronous rectifier type switching regulator having a reverse current prevention function that detects a reverse current and controls transistors for synchronous control. In particular, the invention relates to the above techniques that are effectively applied to, for example, a supply voltage control device comprising switching elements constituting the switching regulator and a dive circuit thereof, its electronic component module for power supply (power supply driver module), and a power supply device.

A synchronous rectifier type switching regulator is one of DC-DC converters. The synchronous rectifier type switching regulator has a switching element located on a path for current flow from a power supply via a coil (inductor) to a load and controls the current flowing into the load by turning the switching element on and off. Moreover, the regulator has another switching element for synchronous rectification between a node connecting the above switching element and the coil and ground (a ground point) to reduce loss by complementary on/off control of this switching element with the main switching element.

Such a synchronous rectifier type switching regulator has a problem in which a useless power loss ratio increases as the load becomes light, whereas this ratio is small when the load is relatively heavy. This is due to that the direction of the current flowing through the coil is reversed as the load becomes light, which causes a negative current (reverse current) to flow through the switching element for synchronous rectification to the ground and results in a loss, whereas a positive current toward the load always flows through the coil during heavy load. To reduce the loss due to this reverse current, an invention arranged to detect a transition to a light load state in which the reverse current flows and turn the ground-side switching element for synchronous rectification off has been proposed (e.g., patent document 1).

[Patent document 1] Japanese Unexamined Patent Publication No. 2002-281743

SUMMARY OF THE INVENTION

Lately, there have been an increasing number of electronic devices in which a microprocessor is mounted as a system controller and the microprocessor's operating frequency tends to become increasingly higher in order to boost the performance of the microprocessor (hereinafter referred to as CPU). Also, the voltage to be supplied to the CPU tends to decrease in order to suppress current consumption and extend battery life.

Portable electronic devices or the like with a built-in CPU often adopt a method in which an operating current is supplied to the CPU by stepping up or down a battery voltage by a switching regulator. It is a key how long the battery life is extended. To extend the battery life, it has been practiced that control is performed to deactivate the whole CPU or a part of the CPU circuitry and put the CPU in a low current consumption state (standby state) when the CPU does not need to operate. In consequence, the current consumption of the CPU tends to vary in a broader range.

Meanwhile, for the power supply to the CPU, the following are required: low voltage, large current output, and high efficiency; a good transient response characteristic to change in the output current; high efficiency during light load, etc. In terms of low voltage, large current output, and high efficiency, the synchronous rectifier type switching regulator is appropriate for use in the power supply circuitry. Furthermore, to meet the requirement of high efficiency during light load, a regulator having a function to prevent a reverse current is appropriate.

However, a regulator configured to detect a current flow direction using a comparator and activate the reverse current prevention function, as disclosed in FIG. 6 in patent document 1, has a drawback in which a reverse current is difficult to detect correctly because the comparator has an input offset. In particular, a reverse current prevention circuit disclosed in FIG. 6 in patent document 1 is to detect a current direction with the comparator monitoring a source-drain voltage of a low-side switch MOS (the switching element for synchronous rectification) and to turn the switch MOS off upon detection of a reverse current. Therefore, a reverse current is easier to detect with a larger on-resistance of the switch MOS.

However, since a large on-resistance of a switch MOS results in a large power loss during normal operation, the on-resistance of a switch MOS is generally designed to be small. Meanwhile, the input offset of the comparator often varies because of manufacturing variance. As a result, with a comparator having a large input offset, it may happen that a voltage to be detected gets under the input offset and cannot be detected.

For example, because, in general, the input offset of the comparator is about ±3 mV, if the on-resistance of the switch MOS is set at 1.4 m$\Omega$ and a drain current at 1 A, only a small source-drain voltage of 1.4 mV will appear, which, therefore, poses a problem in which a reverse current, if occurs, cannot be detected. Also, conventional synchronous rectifier type switching regulators suffered from a problem of low power efficiency during light load.

An object of this invention is to provide a power supply control device and an electronic component for power supply (power supply driver module) for building a synchronous rectifier type switching regulator that is able to correctly detect and prevent a reverse current flowing through a coil (inductance element) during light load using a comparator and has a good power efficiency as well as a power supply device using the above component.

Another object of this invention is to provide a power supply control device and an electronic component for power supply for building a synchronous rectifier type switching regulator having a good conversion efficiency with reduced power loss during light load as well as a power supply device using the above component.

The above and other objects and novel features of this invention will become apparent from the description of the present specification and the accompanying drawings.

A typical aspect of the invention disclosed herein will be summarized below.

In a synchronous rectifier type switching regulator including a reverse current detection circuit that is able to detect a state in which a reverse current flows through an inductance element (coil) and a reverse current prevention function to prevent the reverse current, a switching element for synchronous rectification (low-side switching element) is formed by a plurality of parallel transistors and the parallel transistors are controlled so that a larger part of them are kept off during light load.

According to the above means, a larger part of the switching element for synchronous rectification is not driven on and off during light load. Thus, driving loss involved in driving the switching element for synchronous rectification is reduced during light load and the efficiency of the regulator can be improved. Because a larger part of the parallel transistors are kept off during light load, the on-resistance of the switching element for synchronous rectification increases and a potential difference will become large enough to be detectable with a comparator that is used to detect a reverse current. Thereby, it can be prevented that a reverse current becomes hard to detect because of the input offset of the comparator.

Effects that will be achieved by a typical aspect of the present invention will be briefly described below.

It is possible to correctly detect and prevent a reverse current flowing through the coil (inductance element) using the comparator. A synchronous rectifier type switching regulator with reduced power loss during light load can be realized. As a result, the conversion efficiency of a power supply device is improved, battery consumption is reduced, and it becomes possible to provide a power supply device that is able to drive a portable electronic device that can be used in a light load state like a sleep mode for a longer time with a battery.

DETAILED DESCRIPTION OF THE PREFERRED EMBODIMENTS

Preferred embodiments of the present invention will be described hereinafter, based on the drawings.

Figure 1:
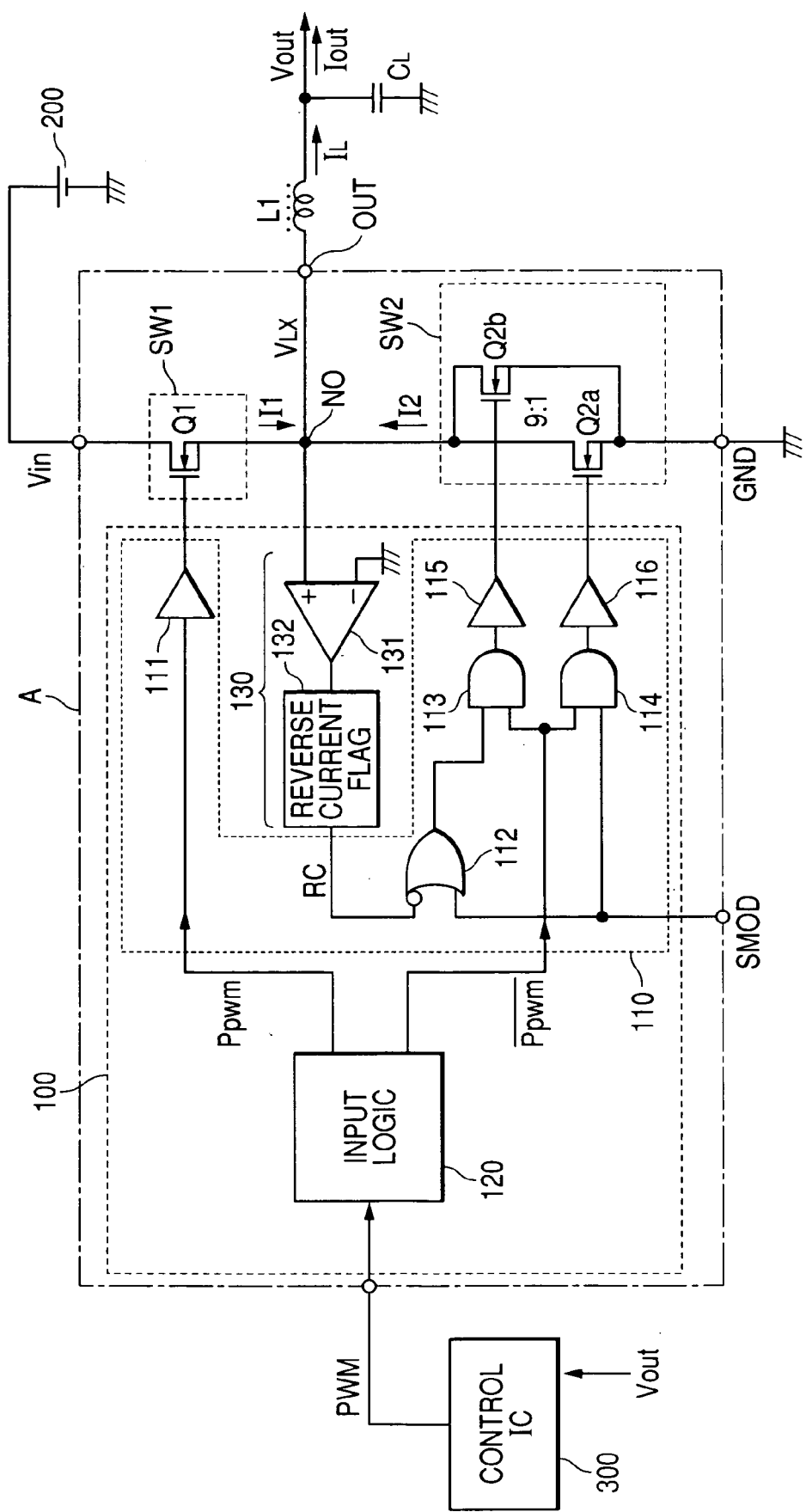
FIG. 1 is a circuit diagram showing an embodiment of an electronic component for power supply to which the present invention is applied and a step-down type, synchronous rectification switching regulator using the above component.

FIG. 1 shows an embodiment of an electronic component for power supply to which the present invention is applied and a step-down type switching regulator as a synchronous rectifier type DC-DC converter.

In FIG. 1, a circuit portion enclosed by a dashed line 100 is a semiconductor integrated circuit for a driver (driver IC) formed on a single semiconductor chip like a monocrystalline silicon chip. SW1 and SW2 are switching elements formed of semiconductor elements such as power MOSFETs. These switching elements SW1 and SW2 and the above driver IC 100 are mounted in a single package, constituting a power supply driver module (a portion enclosed by an alternate long and short dash line A). L1 and CL are discrete electronic components such as a coil and a capacitor which are connected to the above module as external elements.

In this specification, a structure in which a plurality of semiconductor chips and discrete components are mounted on an insulating substrate like a ceramic substrate with conductive terminals arranged on its outer edges and interconnected by bonding wires and printed wiring so that each component fulfills a given role, the structure so constructed that it can be treated as if it was a single electronic component is referred to as a module.

The switching regulator of the present embodiment is comprised of the switching elements SW1 and SW2 connected in series between a voltage input terminal Vin of the above module to which a DC voltage supplied from a battery 200 or the like is input and a ground point (reference potential terminal) GND, a coil L1 as an inductance element with one terminal being connected to an output terminal OUT connected to a node N0 connecting the switching elements SW1 and SW2, and a smoothing capacitor CL connected between the other terminal of the coil L1 and a ground point.

The driver IC 100 is equipped with a switching control circuit 110 which generates drive signals to be applied to the switching elements SW1 and SW1 for on/off control thereof, an input logic 120 which receives a PWM (Pulse Width Modulation) pulse input from an external power supply control IC 300 and generates and supplies PWM control pulses Ppwm and /Ppwm, from which the drive signals for SW1 and SW2 are generated, to the switching control circuit 110, and a reverse current detection circuit 130 which detects a current flowing from the node N0 toward the ground potential GND (hereinafter, this current will be referred to as a reverse current). The level of a drive signal to SW1 is higher than the level of a drive signal to SW2. Although not shown, a circuit for shifting the level of a PWM control pulse Ppwm or drive signal to SW1 is provided in the switching control circuit 110 or input logic 120. A pulse /Ppwm is a pulse with a phase opposite to that of Ppwm.

In this embodiment, both the high-side switching element SW1 and the low-side switching element SW2 are formed by n-channel type MOSFETs, though this is not restrictive. A p-channel type MOSFET may be employed as the high-side switching element SW1. In the present embodiment, the low-side switching element SW2 is comprised of two MOS- FWTs Q2a and Q2b connected in parallel. The sizes (gate widths) of Q2a and Q2b are set at a ratio of 9:1. The ratio of the size of the high-side MOSFET Q1 to the size of Q2a+Q2b is about 1:2.

A large MOSFET like a power MOSFET constructed by forming several thousand to several tens of thousand MOSFETs arranged on a single semiconductor chip and interconnecting the gates of all the MOSFETs, the drains thereof, and the sources thereof, respectively, by wiring patterns or electrodes, so that it operates as if it was a single FET, is provided. If such a power MOSFET is employed, the several thousand to several tens of thousand MOSFETs are divided into two groups sized at the ratio of 9:1 and the MOSFET groups connected in parallel can be used as the above MOSFETs Q2a and Q2b.

The power supply control IC 300 is comprised of, but not limited to, a circuit to generate a signal, for example, a triangle wave signal with a given frequency and a PWM comparator which compares a generated triangular wave signal to an output feedback voltage and generates a PWM control pulse Ppwm having a pulse width in accordance with a potential difference. The control IC 300 operates to increase the PWM pulse width as the output voltage Vout decreases and, conversely, operates to decrease the PWM pulse width as the output voltage Vout increases. That is, the duty ratio of the PWM pulse varies depending on the level of the output voltage Vout to elongate the on-period of the high-side switching element SW1 as the output voltage Vout decreases and elongate the on-period of the low-side switching element SW2 as the output voltage Vout increases. In this way, feedback control is performed to keep the output voltage Vout constant.

The switching control circuit 110 is comprised of a buffer 111 which receives a PWM control pulse Ppwm generated by the input logic 120 and outputs a drive signal to be applied to a gate terminal of the high-side switching element SW1, an OR gate circuit 112 which logically adds an output signal RC of the reverse current detection circuit 130 and a mode control signal SMOD from external of the chip, an AND gate circuit 113 which logically multiplies an output of the OR gate circuit 112 and a PWM control pulse /Ppwm from the input logic 120, an AND gate circuit 114 which logically multiples the PWM control pulse /Ppwm and the mode control signal SMOD, and buffers 115 and 116 which, respectively, receive the outputs of the AND gates 113 and 114 and output drive signals to be applied to the gate terminals of the low-side switch MOSFETs Q2a and Q2b. The mode control signal SMOD is the signal indicating whether the system is placed in a sleep mode when there is a light load or an active mode when there is a normal load and indicates the active mode when it is at a high level and the sleep mode when it is at a low level.

The switching elements SW1 and SW2 are turned on and off complementarily by the PWM control pulses Ppwm and /Ppwm from the input logic 120; that is, it is ensured that, when one SW is on, the other SW is off. Moreover, the buffers 111, 115, ad 116 generate drive signals including a dead time to prevent the switching elements SW1 and SW2 from being turned on to carry current simultaneously and supply these signals to the SW1 and SW2 (Q2a and Q2b).

The reverse current detection circuit 130 is comprised of a comparator 131 for reverse current detection which compares a potential VLX at the node N0 connecting the switching elements SW1 and SW2 to a given reference voltage like the ground potential GND, and a reverse current flag circuit 132 consisting of, but not limited to, a flip-flop and a counter to hold a reverse current state detected for a given time and a reset circuit which generates a signal to reset the flip-flop and counter.

In the sleep mode when the mode control signal SMOD is at low level, the reverse current detection circuit 130 monitors the potential VLX at the node N0 and, when it detects a reverse current and its output RC changes to the high level, the output of the OR gate circuit 112 in the switching control circuit 110 changes to the low level and the AND gate circuit 113 is closed. Therefore, when a reverse current through the coil occurs during light load, notwithstanding that the PWM control pulse /Ppwm is input from the input logic 120 to the AND gate circuit 112, supplying a gate drive signal to the MOSFET Q2b of the low-side switching element SW2 is stopped and the Q2b is turned off.

On the other hand, the MOSFET Q2a is kept off, when the mode control signal SMOD is at low level indicating the sleep mode. In this mode, because the AND gate circuit 114 is closed, supplying a gate drive signal to the Q2b is shut off, regardless of whether or not a reverse current is detected. In the active mode when the mode control signal SMOD is at high level, the AND gate circuits 113 and 114 are open, regardless of whether or not a reverse current is detected, and the PWM control pulse/Ppwm is supplied to the buffers 114 and 115 to drive the Q2a and Q2b on and off simultaneously.

In short, the switching regulator of this embodiment is characterized in that both the MOSFETs Q2a and Q2b of the low-side switching element SW2 are driven during normal load (active mode), whereas only one MOSFET Q2b is driven on and off during light load (sleep mode). Thereby, the on-resistance of the low-side switching element SW2 increases during light load and the variation range of the potential VLX at the node N0 connecting the switching elements SW1 and SW2 becomes greater than when both the Q2a and Q2b are driven, consequently, a reverse current state can be detected, despite the input offset of the comparator 131.

Figure 2:
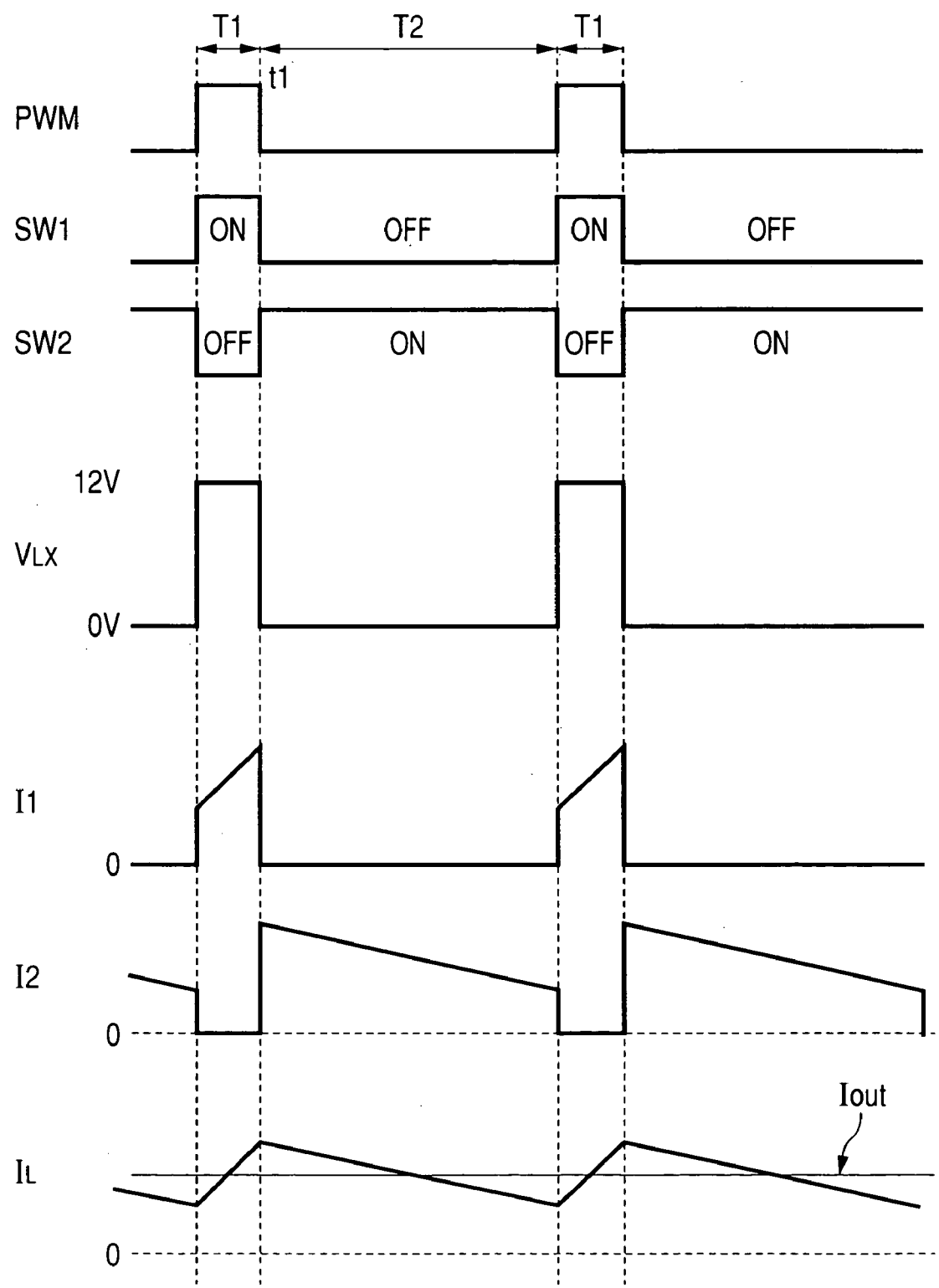
FIG. 2 is a timing chart showing signal timing during normal load for the switching regulator according to the embodiment and a conventional type regulator.
Figure 3:
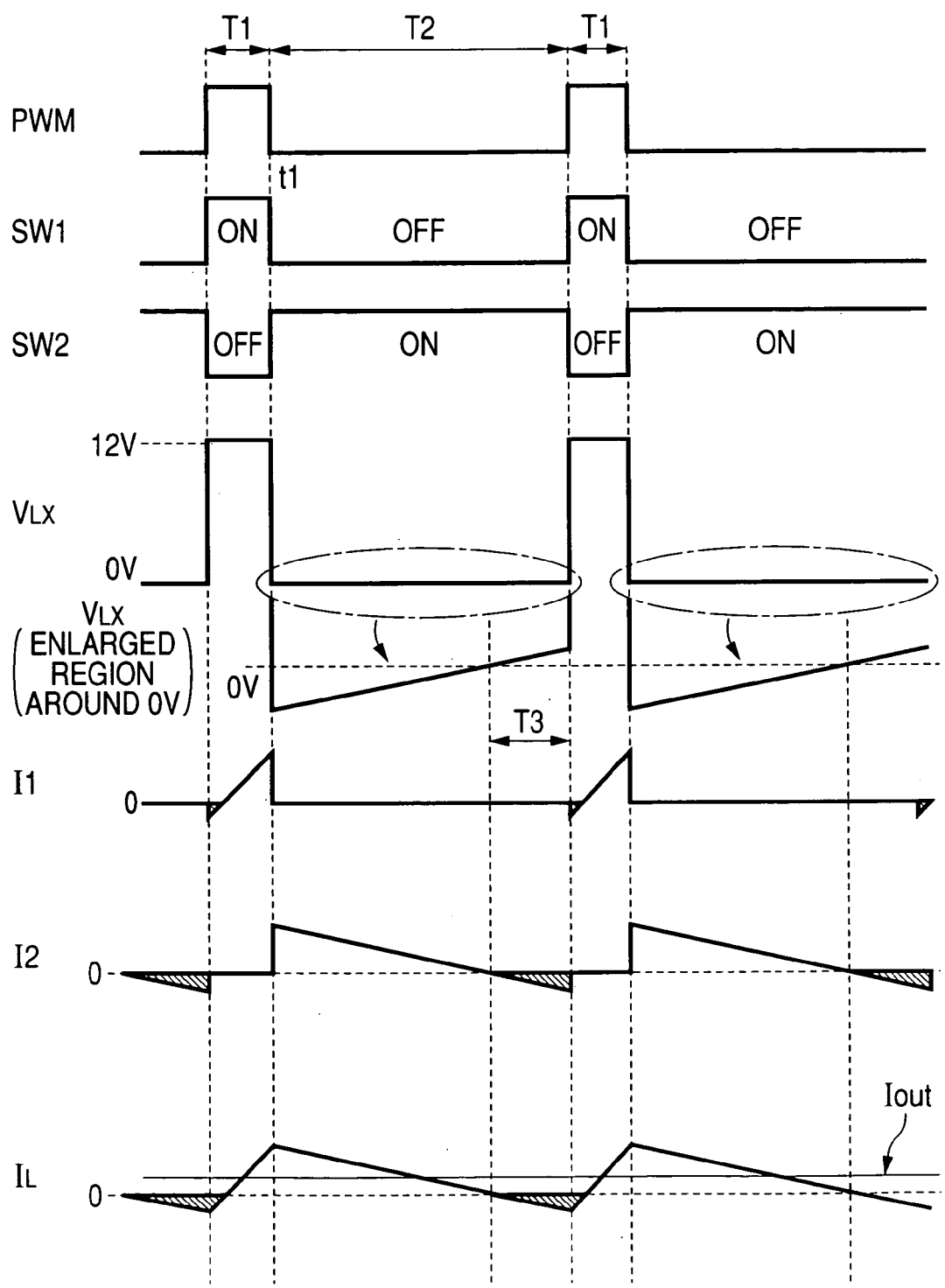
FIG. 3 is a timing chart showing signal timing during light load for the regulator of a type without a reverse current prevention function.
Figure 4:
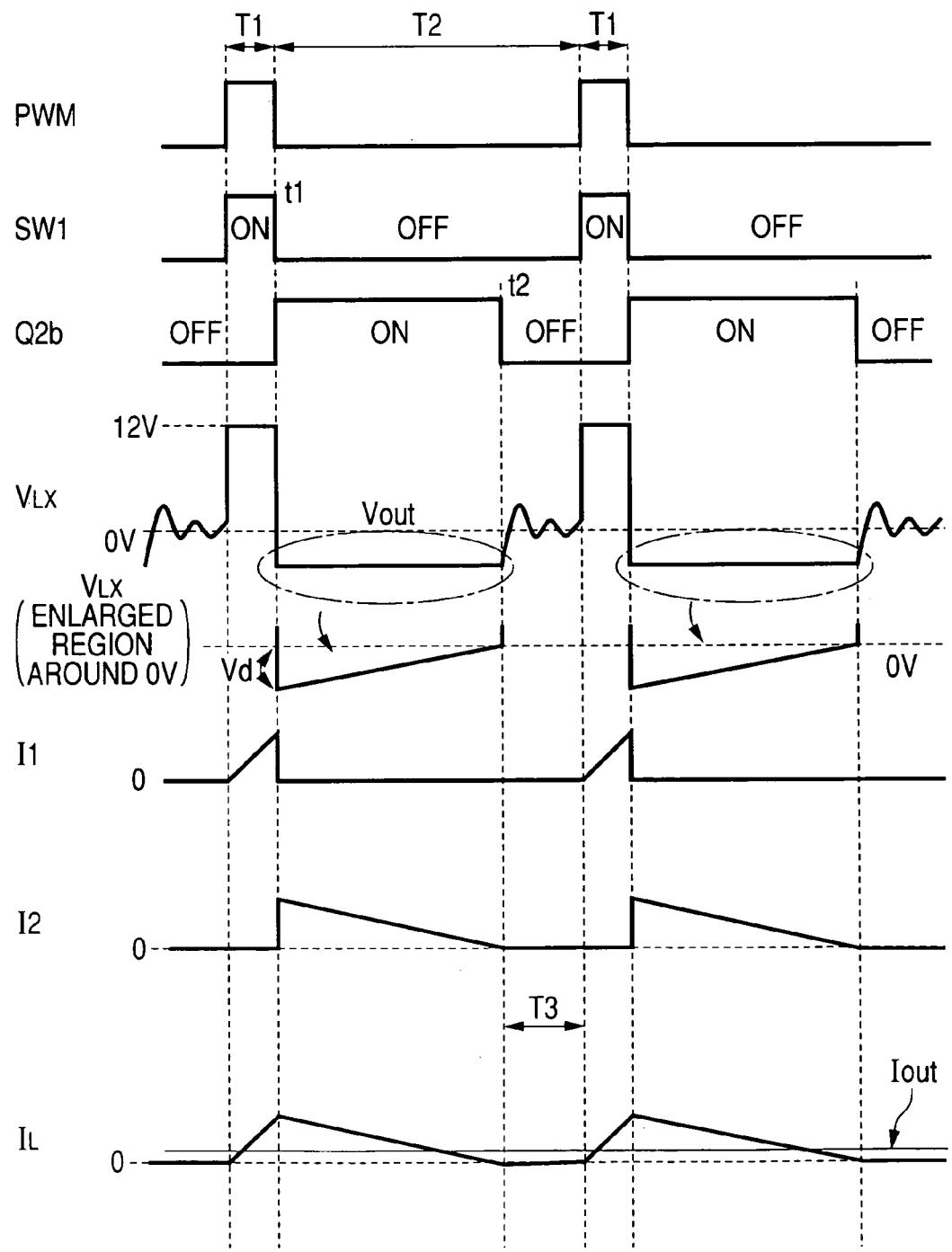
FIG. 4 is a timing chart showing signal timing during light load for the switching regulator according to the embodiment.

Next, the operation of the switching regulator according to the above embodiment and the operation of a regulator of a type without the reverse current prevention function during normal load and during light load are discussed, using timing charts of FIGS. 2 to 4. FIG. 2 shows an operation timing chart during normal load, which is common to both types. FIG. 3 shows an operation timing chart during light load for the type without the reverse current prevention function. FIG. 4 shows an operation timing chart during light load for the regulator according to the embodiment. Signals to drive the switching elements SW1 and SW2 on and off actually include a dead time to avoid an overlap of high level periods of both SWs and to prevent current from flowing through both SWs simultaneously, though not shown clearly in FIGS. 2 to 4.

As shown in FIGS. 2 to 4, during a high level period T1 of the PWM control pulse Ppwm, the high-side switching element SW1 is on and the low-side switching element SW2 is off. During this period, an input voltage Vin (12 V) is applied to the node N0 connecting the switching elements SW1 and SW2, the potential VLX at the node being 12 V, current I1 flows from the switching element SW1 toward the coil L1, and current IL flowing through the coil L1 gradually increases. At this time, during normal load, for either type of regulator, the current IL flowing through the coil L1 is positive, that is, flows in a forward direction (toward the load). However, during light load, because of a small output current Iout, for the regulator of the type without the reverse current prevention function, a reverse, namely, negative current −IL flows through the coil L1, as indicated by an IL transition graph for a period T3 in FIG. 3.

On the other hand, for the regulator according to the above embodiment, during light load, at timing t1, the high-side switching element SW1 is turned off and the low-side switching element SW2 is turned on, as shown in FIG. 4. To let current continue to flow through the coil, the potential VLX at the node N0 connecting the switching elements SW1 and SW2 drops to a negative and gradually increases. At timing t2 when the direction of the current IL though the coil L1 is about to be reversed, the potential VLX at the node N0 returns to 0 V (=GND) and the output of the comparator 131 is inversed. Thereby, the reverse current prevention function works and the low-side switching element SW2 also is turned off.

In consequence, the connecting node N0 becomes floating and ringing of the potential VLX at the node N0 around the output voltage Vout takes place by a resonance action of an inductance component of the coil L1 and parasitic capacitance of the node N0. However, the current IL flowing through the coil L1 does not become negative, that is, no reverse coil current will flow, as indicated by an IL transition graph for the period T3 in FIG. 3. By preventing a reverse current in this way, it is avoided that a useless current flows from the coil to the ground point and power efficiency decreases.

Now, it is seen from a waveform graph of the potential VLX at the connecting node N0, shown in FIG. 4, that the deeper a drop of the XLV waveform at timing T1, the greater will be the waveform gradient and a reverse current will be easier to detect by the comparator 131. Conversely, if the amount of drop Vd of VLX from 0 V at timing t1 is smaller than the input offset of the comparator 131, a zero-cross point cannot be detected by the comparator 131.

In the regulator of the above embodiment, the low-side switching element SW2 is made up of the two MOSFETs Q2a and Q2b connected in parallel and the Q2a of the two MOSFETs of the low-side switching element SW2 is kept off by the mode control signal SMOD during the sleep mode when there is a light load. Therefore, current flows through only the Q2b and the on-resistance of the SW2 is greater than in normal mode when both the Q2a and Q2b are turned on (10 times as much as the on-resistance in normal mode in this embodiment). As a result, the drop of the potential VLX at the connecting node N0 when the Q2b is turned on (at timing t1) becomes deeper and the zero-cross point becomes easier to detect by the comparator 131.

Next, power efficiency of the switching regulator of the above embodiment is discussed in comparison with conventional type regulators.

Figure 5:
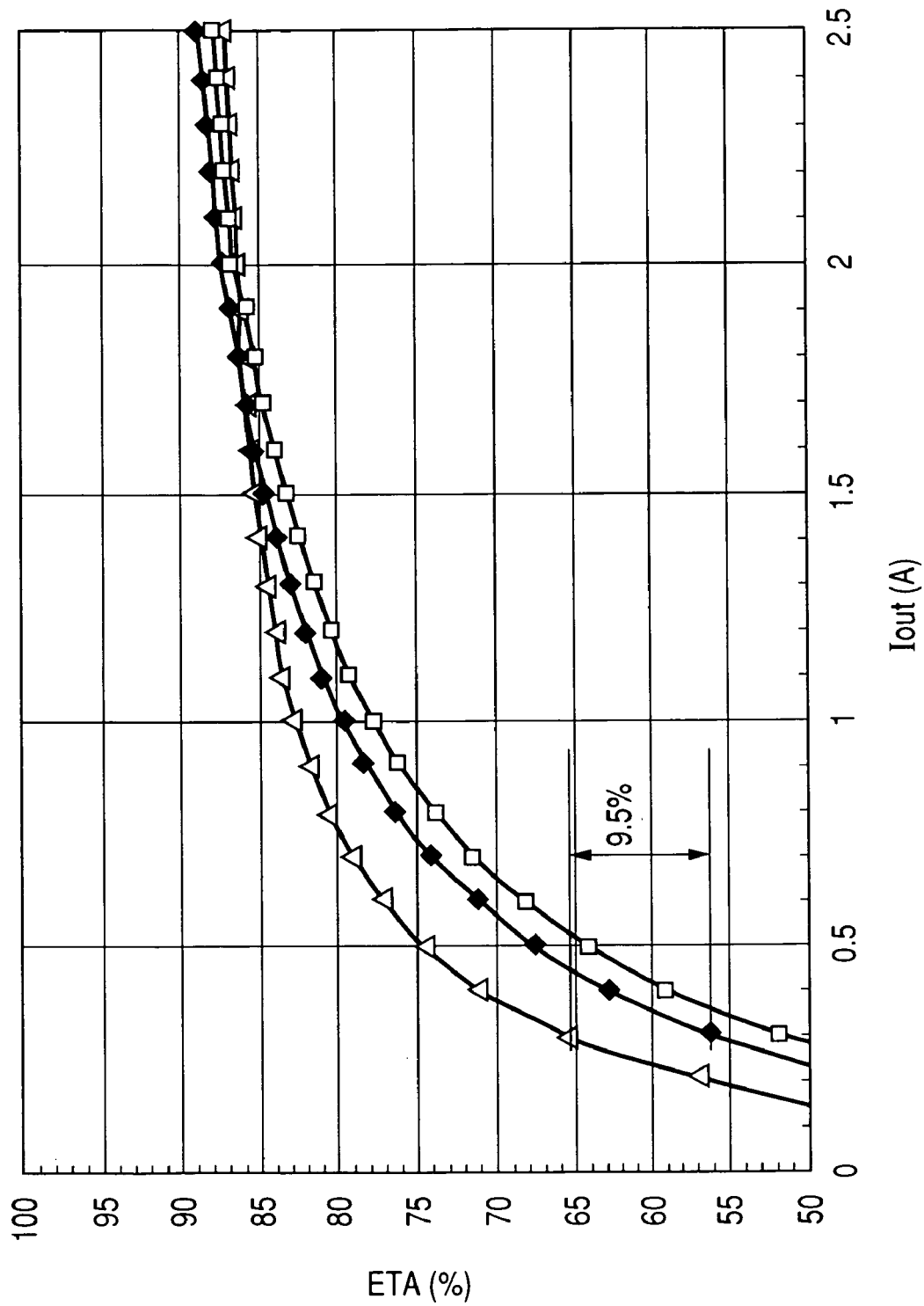
FIG. 5 is a graph of power efficiency characteristics obtained from simulation of the operations of the switching regulator according to the embodiment and a conventional type regulator in which the low-side switching element SW2 is not divided into Q2a and Q2b, with output current Iout being plotted on the abscissa.

FIG. 5 shows power efficiency characteristics obtained from simulation of the operations of the switching regulator according to the embodiment and the conventional type regulators, with output current Iout being plotted on the abscissa. The simulation was conducted with the following settings: input voltage Vin is 12 V, output voltage Vout is 1.3 V, PWM control pulse frequency is 500 kHz, and inductance L of coil is 0.45 μH.

In FIG. 5, an open square dotted line plots the power efficiency of the regulator of the type without the reverse current prevention function, a diamond dotted line plots the power efficiency of the regulator of a type with the reverse current prevention function, but the low-side switching element SW2 not divided into Q2a and Q2b, and an open triangle dotted line plots the power efficiency of the regulator according to the embodiment wherein reverse current prevention is performed and only the Q2b of the switching element SW2 is driven on and off with the Q2a being off in a region of smaller output current Iout, namely, during light load.

From FIG. 5, it is apparent that the power efficiency of the regulator according to the embodiment in the region of smaller output current Iout, namely, during light load, is improved by nearly 10% when, for example, Iout=0.3 A. In FIG. 6, in a region of larger output current Iout, that is, during heavy load, the power efficiency of the conventional type represented by the diamond dotted line is higher than that of the regulator of the embodiment represented by the open triangle dotted line, because the conventional type employs, as the low-side switching element SW2, an undivided MOSFET as large as the combination of the MOSFETs Q2a and Q2b employed in the embodiment.

The reason why the power efficiency of the regulator is improved when only the Q2b of the low-side switching element SW2 is driven with the Q2a being off during light load is that the power loss of the SW2 decreases.

Figure 6A:
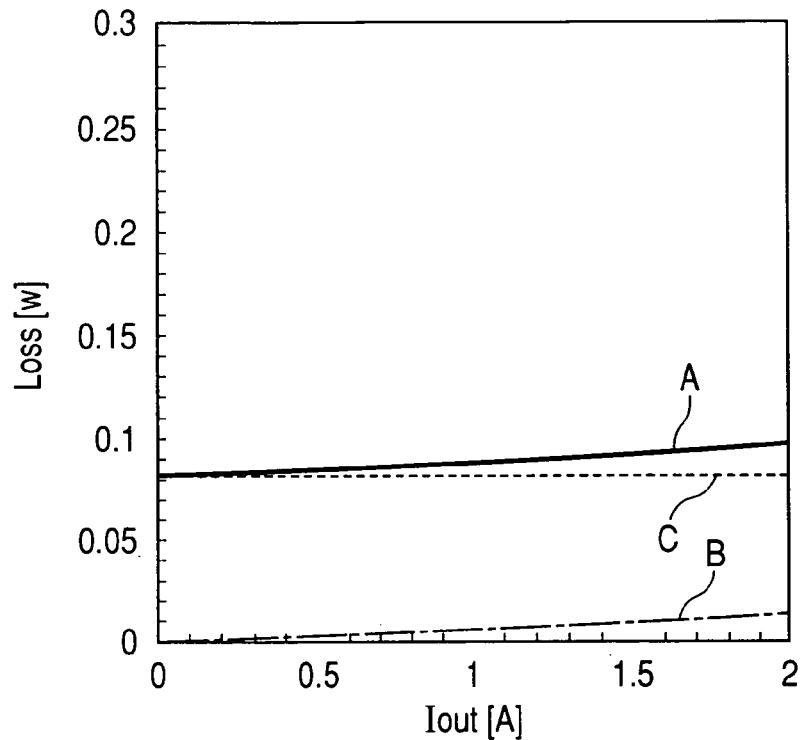
FIG. 6A is a graph of power loss characteristics of both transistors of the low-side switching element when both high-side and low-side switching elements are driven, with output current Iout being plotted on the abscissa.
Figure 6B:
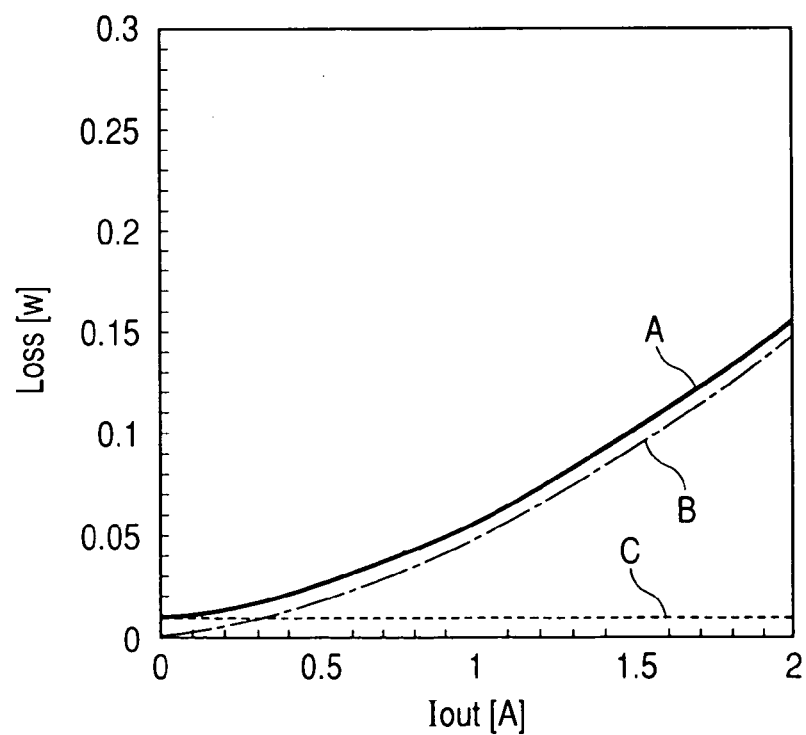
FIG. 6B is a graph of power loss characteristics of the low-side switching element when one transistor of the low-side switching element is kept off, while only the other transistor is driven, with output current Iout being plotted on the abscissa.

FIG. 6A shows power loss characteristics of SW2 when both the MOSFETs Q2a and Q2b are driven and FIG. 6B shows power loss characteristics of SW2 when only the Q2b of the low-side switching element SW2 is driven with the Q2a being off, with output current Iout being plotted on the abscissa. The simulation was conducted under the following conditions: input voltage Vin is 12 V, output voltage Vout is 1.3 V, PWM control pulse frequency is 500 kHz, inductance L of coil is 0.45 μH, and gate-source voltage is 5 V. The MOSFETs Qa and Qb are sized at a ratio of 9:1. The MOSFET Q2b with an on-resistance of 27 mΩ and an equivalent input capacitance Ciss of 677 pF was used. Hence, when both Q2a and Q2b are driven, the on-resistance of the SW2 will be 2.7 mΩ and the equivalent input capacitance Ciss will be 6667 pF.

In FIGS. 6A and 6B, an alternate long and short dash line B represents loss by the on-resistance of the MOSFETs or one MOSFET, a dashed line C represents loss involved in driving the MOSFETs or one MOSFET, a solid line A represents total loss as the combination of the above losses. Driving loss is proportional to equivalent input capacitance Ciss, voltage Vgs raised to the second power, and operating frequency f, and does not depend on current Iout. Therefore, in either case, the dashed line C is constant. However, because the MOSFET size as a whole to be driven is greater in the case of FIG. 6A, the driving loss is higher than that shown in FIG. 6B.

When both Q2a and Q2b are driven, because the on-resistance Ron is small, but the parasitic capacitance Ciss is large, the driving loss constitutes most of the total loss, as shown in FIG. 6A. On the other hand, when only the Q2b is driven, the parasitic capacitance Ciss is small, but the on-resistance Ron is large, the resistance loss constitutes most of the total loss, as show in FIG. 6B. It is apparent from FIGS. 6A and 6B that, in the regulator of the embodiment, the total loss in the case where only the Q2b is driven is smaller than that in the case where both are driven, when the output current Iout is 1.4 A and below.

As for the high-side switching element SW1, its turn-on loss is proportional to the equivalent capacitance, voltage raised to the second power, and operating frequency of the node N0. By provision of the reverse current protection function to prevent a negative current flow, like the regulator of the embodiment, the potential VLX at the node N0 connecting the switching elements SW1 and SW2 becomes relatively high. Consequently, because the drain-source voltage becomes small when the MOSFET Q1 is turned on, there is an advantage that turn-on loss of the high-side MOSFET Q1 is smaller than the regulator without the reverse current protection function.

This is obviously explained from the charts of FIG. 3 and FIG. 4. When the MOSFET Q1 is turned on, the potential VLX at the connecting node N0 rises from 0 V up to 12 V in FIG. 3 for the regulation without reverse current prevention, whereas the potential VLX at the connecting node N0 rises from output voltage Vout (1.3V) at this time up to 12 V, that is, changes but to a smaller extent in FIG. 4 for the regulator with reverse current prevention. Because input voltage is 12V and output voltage Vout is 1.3 V in this embodiment, the effect of reducing the driving loss of the high-side MOSFET Q1 is smaller than the effect of reducing the driving loss of the low-side MOSFET Q2. However, if the output voltage Vout becomes higher, the effect of reducing the driving loss of the high-side MOSFET Q1 will be significant.

The reason why, in this embodiment, only the low-side switching element SW2 is divided into two and one MOSFET is kept off during light load, whereas the high-side switching element SW1 is not divided into two is that the gate driving loss of SW1 is negligible because the gate capacitance of SW1 is essentially smaller than SW2 and a significance is placed on ensuring reverse current detection by the comparator 131. If a significance is also placed on improving power efficiency during light load, the high-side switching element SW1 may be configured such that it is divided into two and one MOSFET is kept off during light load.

While the first embodiment of the present invention has been described hereinbefore, as another embodiment, it may be possible to form the switching element SW2 by one MOSFET Q2 and decrease the gate driving voltage for the SW2 during light load, instead of forming the low-side switching element SW2 by two MOSFETs Q2a and Q2b and drive only one MOSFET during light load, as in the foregoing embodiment. By this implementation, it is also possible to increase the on-resistance of the switching element SW2 during light load so that the comparator 131 can detect a reverse current assuredly and, moreover, to improve the power efficiency during light load because the driving loss of SW2 is proportional to the driving voltage raised to the second power, as mentioned above.

In the regulator as configured for the first embodiment, the driver IC 100 receives a mode control signal SMOD from external and, by this signal, Q2a, one of the two MOSFETS of the low-side switching element SW2 is kept off during light load. However, the regulator may be configured such that a circuit to detect the output current Iout is provided in the driver IC 100 or control IC 300, and Q2a, one of the two MOSFETS of the low-side switching element SW2, is kept off during light load detected by the above circuit, for example, when Iout is 1 A or below.

Figure 7:
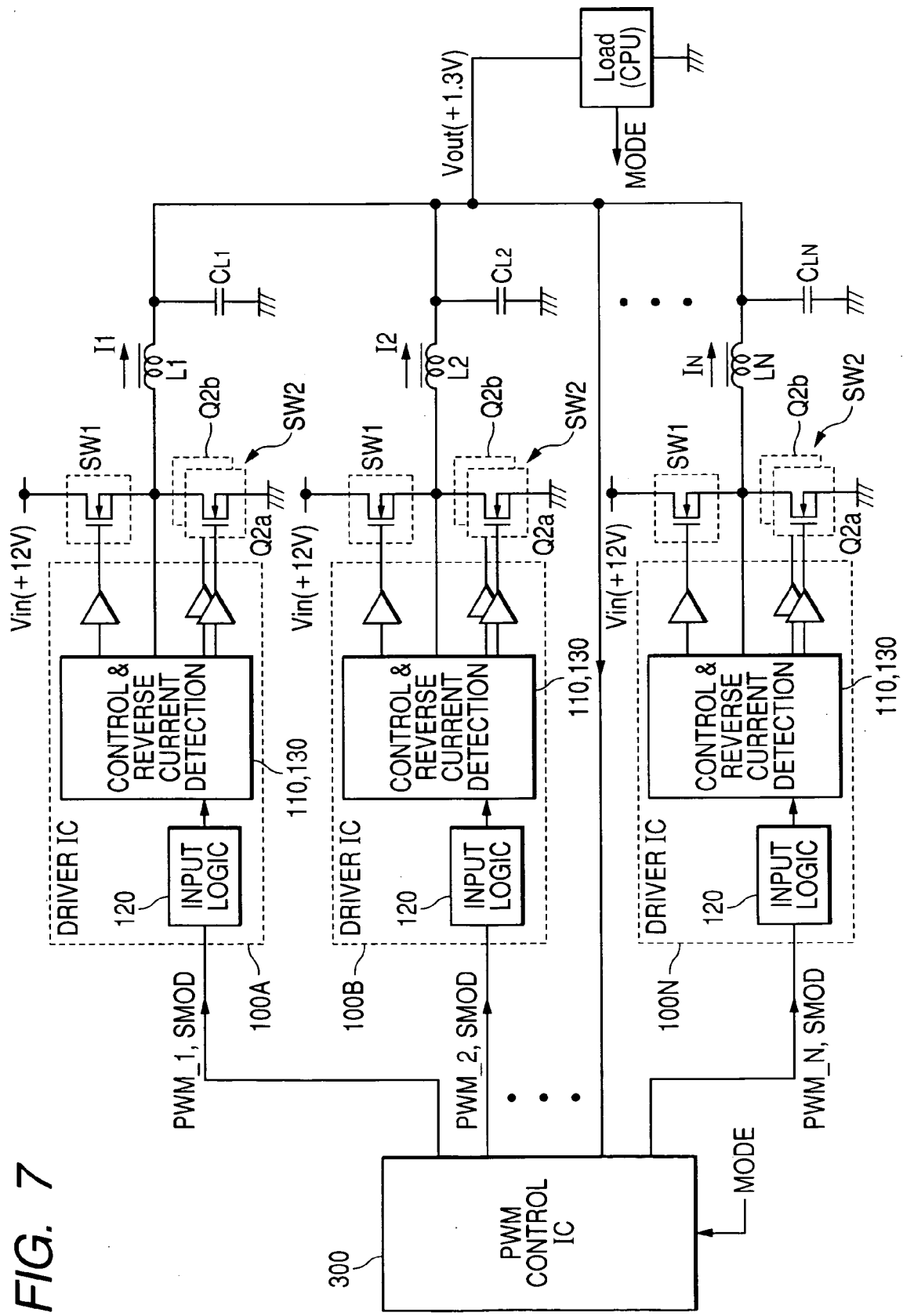
FIG. 7 is a block diagram showing an example of a configuration of a multiphase type power supply device employing a plurality of power supply driver modules in which the present invention is embodied.

FIG. 7 shows an example of a configuration of a multiphase type power supply device employing a plurality of power supply driver modules in which the present invention is embodied.

The power supply device of FIG. 7 is a system suitable for a load that requires current larger than the current supply capacity of a single switching regulator or a load that requires s very stable supply voltage. In FIG. 7, driver ICs are identified by 100A, 100B, ... 100N and each is a driver IC having the structure as shown in FIG. 1. A plurality of power supply driver modules, each comprising a driver IC and switching elements SW1 and SW2, are controlled under PWM drive control by a single PWM control IC 300. Each low-side switching element SW2 is formed by two parallel MOSFETs Q2a and Q2b which are not shown.

To coils L1, L2, ... LN through which currents supplied by each power supply driver module flows, stabilizing capacitors CL1, CL2, ... CLN are connected, respectively. Voltage Vout stabilized by these capacitors is supplied to a common load (e.g., a microcomputer system having a CPU) LOAD and fed back to the PWM control IC 300. The feedback voltage may be a divided voltage through series resistors inserted between the output terminal and a ground point.

Based on a fed back output voltage Vout, the PWM control IC 300 determines a PWM control pulse duty for the overall system so that the voltage will match an intended voltage, and shifts the phases of PWM control pluses PWM_1, PWM_2, ... PWM_N to be supplied, respectively, to the driver ICs 100A, 100B, ... 100N. As a result, the peaks of the currents to be output from the coils L1, L2, ... LN of the regulators are shifted and more stable currents are supplied to the load LOAD than for a single regulator. In this system, a signal or code MODE indicating a mode is sent from the CPU as the load to the PWM control IC 300, which is not so limited. The PWM control IC recognizes or decodes it and supplies a mode control signal SMOD to the driver ICs 100A, 100B, ... 100N. Depending on the SMOD signal, in each driver IC, one transistor of the low-side switching element SW2 is kept off during light load.

In some implementation, the PWM control IC 300 may decrease the frequencies of the PWM control pluses PWM_1, PWM_2, ... PWM_N for the driver ICs 100A, 100B, ... 100N during sleep mode. This can further improve power efficiency during light load.

While the invention made by the present inventors has been described specifically, based on its embodiments, it will be appreciated that the present invention is not limited to the embodiments described hereinbefore and various changes may be made without departing from the scope of the invention. For instance, for the switching regulator of the described embodiment, PWM drive control is applied, that is, the output voltage is controlled by changing the duty of a control pulse with a given frequency which is supplied from the PWM control IC to a driver IC. However, switching control is not limited to PWM control and the invention can also be applied to a device or system that is configured to change timings when a control signal for the switching elements SW1 and SW2 falls and rises, according to the output voltage.

While, in the described embodiment, the driver IC 100 and the switching elements SW1 and SW2 are formed on separate semiconductor chips, it is needless to say that the IC and the switching elements may be formed on a single semiconductor chip. In the described embodiment, though a module is constructed by mounting one driver IC 100 and a couple of switching elements SW1 and SW2 in a single package, a multiphase module may be constructed by mounting two or more couples of switching elements SW1 and SW2 and driver ICs 100 capable of driving them in a single package.

Furthermore, although the low-side switching element SW2 is formed by two MOSFETs Q2a and Q2b connected in parallel in the described embodiment, it is also possible to form the SW2 by three or more transistors and control them, depending on the load, in such a manner as to keep more transistors off as the load becomes lighter.

In the described embodiment, the MOSFETs Q2a and Q2b of the low-side switching element SW2 are sized at a ratio of 9:1. However, this size ratio is changed appropriately for a system, because an optimum ratio varies, depending on the conditions such as the characteristics of the MOSFETs in use and a voltage to which the input voltage should be converted.

While the foregoing description of the invention made by the present inventors focused on a step-down type switching regulator in the background usage field of the invention, the invention can also be used for a step-up/step-down type synchronous rectification switching regulator or the like.

What is claimed is:

1. A power supply control device which performs complementary on/off control of a first switching element and a second switching element which are coupled in series between an voltage input terminal and a reference potential terminal, allows current to flow through an inductance element coupled to a node coupling said first and second switching elements, thereby converting a voltage being applied to said voltage input terminal into a voltage which is output, includes a reverse current detection circuit to detect a reverse current state of said second switching element, and has a reverse current prevention function which prevents said second switching element from being turned on for a period during which said second switching element is to be turned on when the reverse current detection circuit detects the reverse current state, wherein said second switching element comprises a plurality of transistors coupled in parallel and the plurality of transistors are controlled so that more transistors will be kept off during a lighter load.

2. The power supply control device according to claim 1, wherein said second switching element comprises two transistors and a larger one of said two transistors is kept off during light load.

3. The power supply control device according to claim 1, wherein said reverse current detection circuit includes a comparator which compares a potential at the node coupling said first switching element and said second switching element to a given potential and detects a reverse current state.

4. An electronic component for power supply, the electronic component comprising: a first switching element and a second switching element which are coupled in series between an voltage input terminal and a reference potential terminal; and a semiconductor integrated circuit for drive, the semiconductor integrated circuit performing complementary on/off control of the switching elements, the first and second switching elements and the semiconductor integrated circuit being mounted in a single package, the electronic component allowing current to flow through an inductance element coupled to a node coupling said first and second switching elements, thereby converting a voltage being applied to said voltage input terminal into a voltage which is output, wherein said second switching element comprises two transistors coupled in parallel, wherein said semiconductor integrated circuit includes a reverse current detection circuit to detect a reverse current state of said second switching element, has a reverse current prevention function which prevents said second switching element from being turned on for a period during which said second switching element is to be turned on, when the reverse current detection circuit detects the reverse current state, and causes one of said two transistors coupled in parallel to be kept off during light load.

5. The electronic component for power supply according to claim 4, wherein said reverse current detection circuit includes a comparator which compares a potential at the node connecting said first switching element and said second switching element to a given potential and detects a reverse current state.

6. The electronic component for power supply according to claim 4, wherein said semiconductor integrated circuit is equipped with a terminal for receiving a control signal indicating whether a load supplied from external is light or heavy, and causes either of said two transistors to be kept off when said control signal indicates a state equivalent to the light load state.

7. A power supply device comprising:
the electronic component for power supply as recited in claim 4;
an integrated circuit for control, the integrated circuit generating PWM control pulses with a duty adjusted according to an output voltage and supplying the PWM control pulses to said semiconductor integrated circuit;
an inductance element coupled to an output terminal of said electronic component for power supply; and
a smoothing capacitor coupled to the other terminal of the inductance element.

8. A power supply device comprising:
the electronic component for power supply as recited in claim 6;
an integrated circuit for control, the integrated circuit generating PWM control pulses with a duty adjusted according to an output voltage and supplying the PWM control pulses to said semiconductor integrated circuit;
an inductance element coupled to an output terminal of said electronic component for power supply; and
a smoothing capacitor coupled to the other terminal of the inductance element,
wherein said control signal is supplied from said integrated circuit for control to said semiconductor integrated circuit.

9. The power supply device according to claim 8, wherein a plurality of said electronic components for power supply are coupled to said integrated circuit for control and the PWM control pulses with different phases from each other are supplied from said integrated circuit for control to said plurality of electronic components for power supply.

10. The power supply device according to claim 7, wherein an output voltage is lower than an input voltage.

* * * * *